(12) United States Patent
Yoshida

(10) Patent No.: US 11,614,169 B2
(45) Date of Patent: Mar. 28, 2023

(54) SEAL RING

(71) Applicant: NOK CORPORATION, Tokyo (JP)

(72) Inventor: Yusuke Yoshida, Kitaibaraki (JP)

(73) Assignee: NOK CORPORATION, Tokyo (JP)

( * ) Notice: Subject to any disclaimer, the term of this patent is extended or adjusted under 35 U.S.C. 154(b) by 71 days.

(21) Appl. No.: 16/965,162

(22) PCT Filed: Aug. 9, 2019

(86) PCT No.: PCT/JP2019/031569
§ 371 (c)(1),
(2) Date: Jul. 27, 2020

(87) PCT Pub. No.: WO2020/032236
PCT Pub. Date: Feb. 13, 2020

(65) Prior Publication Data
US 2021/0356044 A1 Nov. 18, 2021

(30) Foreign Application Priority Data

Aug. 9, 2018 (JP) .............................. JP2018-150722

(51) Int. Cl.
*F16J 15/32* (2016.01)
*F16J 15/3272* (2016.01)
(Continued)

(52) U.S. Cl.
CPC ....... *F16J 15/3272* (2013.01); *F16J 15/3204* (2013.01); *F16J 15/3216* (2013.01); *F16J 15/441* (2013.01)

(58) Field of Classification Search
CPC .. F16J 15/3272; F16J 15/3204; F16J 15/3216; F16J 15/441; F16J 15/442; F16J 15/164
See application file for complete search history.

(56) References Cited

U.S. PATENT DOCUMENTS

2014/0175755 A1* 6/2014 Luchs .................... F16J 15/064
277/500
2015/0048574 A1* 2/2015 Seki ....................... F16J 15/181
277/589
(Continued)

FOREIGN PATENT DOCUMENTS

JP H10-141506 A 5/1998
JP 2017150674 A * 8/2017 ............. F16J 15/164
(Continued)

*Primary Examiner* — Eugene G Byrd
*Assistant Examiner* — L. Susmitha Koneru
(74) *Attorney, Agent, or Firm* — Harness, Dickey & Pierce, P.L.C.

(57) ABSTRACT

A seal ring has, on an outer peripheral surface side thereof, a pair of recessed parts 140 extending in a circumferential direction on both sides in a width direction thereof to form a projection part 120 between the pair of recessed parts 140, and has a plurality of ribs 130 connected to the projection part 120 and extending to lateral surfaces of the seal ring at intervals in the circumferential direction inside the pair of recessed parts 140, and a plurality of ribs 130 arranged on a sealed region side among the plurality of ribs 130 have lateral-wall surfaces on an upstream side in a relative rotation direction of a housing with respect to a shaft, each of the lateral-wall surfaces having inclined surfaces inclined from the upstream side to a downstream side in the relative rotation direction of the housing from the projection part 120 toward the lateral surfaces of the seal ring.

4 Claims, 8 Drawing Sheets

(51) Int. Cl.
*F16J 15/3204* (2016.01)
*F16J 15/44* (2006.01)
*F16J 15/3216* (2016.01)

(56) References Cited

U.S. PATENT DOCUMENTS

| | | | | |
|---|---|---|---|---|
| 2015/0362074 A1* | 12/2015 | Seki | .................. | F16J 15/441 |
| | | | | 277/512 |
| 2016/0116066 A1 | 4/2016 | Watanabe et al. | | |
| 2020/0217419 A1* | 7/2020 | Seki | .................. | F16J 15/3244 |

FOREIGN PATENT DOCUMENTS

| | | |
|---|---|---|
| JP | 6191689 B2 | 9/2017 |
| WO | 2014/041832 A1 | 3/2014 |
| WO | 2014196403 A1 | 12/2014 |

\* cited by examiner

SEAL RING

CROSS-REFERENCE TO RELATED APPLICATIONS

This application is a National Stage of International Application No. PCT/JP2019/031569, filed Aug. 9, 2019 (now WO 2020/032236A1), which claims priority to Japanese Application No. 2018-150722, filed Aug. 9, 2018. The entire disclosures of each of the above applications are incorporated herein by reference.

FIELD

The present disclosure relates to a seal ring that seals an annular gap between a shaft and a shaft hole of a housing.

BACKGROUND

An automatic transmission (AT) or a continuously variable transmission (CVT) for an automobile is provided with a seal ring that seals an annular gap between a shaft and a housing rotating relative to each other to maintain hydraulic pressure. The applicant of the present application has already proposed a seal ring capable of reducing rotation torque (see PTL 1). Hereinafter, a seal ring according to a conventional example will be described with reference to FIGS. 7 and 8. FIG. 7 is a view of the seal ring according to the conventional example when seen from its outer peripheral surface side, and FIG. 8 is a view obtained by partially enlarging the view of the seal ring according to the conventional example.

A seal ring 700 according to the conventional example has, on the outer peripheral surface side, a pair of recessed parts 730 extending in a circumferential direction on both sides in its width direction. Thus, a projection part 710 is formed between the pair of recessed parts 730. In the seal ring 700 thus configured, since fluid pressure from an inner peripheral surface side and fluid pressure from the outer peripheral surface side can be cancelled each other at the recessed parts 730 when the fluid pressure (such as hydraulic pressure) acts, sliding resistance can be reduced. Thus, rotation torque can be reduced. However, if the seal ring 700 employs a configuration in which only the projection part 710 provided on the outer peripheral surface side of the seal ring 700 is caused to slide, the seal ring 700 is easily inclined and may make its posture unstable. Accordingly, the seal ring 700 has, inside the pair of recessed parts 730, a plurality of ribs 720 connected to the projection part 710 and extending to lateral surfaces of the seal ring at intervals in the circumferential direction.

However, in the case of the above seal ring 700, the ribs 720 are configured to extend perpendicular to the projection part 710. Accordingly, the lateral-wall surfaces of the projection part 710 and the lateral-wall surfaces of the ribs 720 are configured to perpendicularly cross each other. Thus, when the seal ring 700 is used under an environment in which an amount of foreign matter contained in a fluid to be sealed (such as oil) is large, the foreign matter is easily accumulated at parts (corner parts) at which the lateral-wall surface of the projection part 710 and the lateral-wall surfaces of the ribs 720 cross each other. This point will be described in detail with reference to FIG. 8.

In FIG. 8, an arrow R1 indicates a rotation direction of a shaft and the seal ring 700 with respect to a housing in a case in which the shaft and the housing (both not shown) rotate relative to each other. An arrow R2 indicates the rotation direction of the housing with respect to the shaft and the seal ring 700. In this case, a fluid to be sealed flows in a direction indicated by an arrow S0 in FIG. 8. If the fluid to be sealed contains a large amount of foreign matter, the foreign matter C is accumulated at a corner part on an upstream side in the direction in which the fluid to be sealed flows (the direction indicated by the arrow S0) and on a side on which the fluid to be sealed is sealed among four corner parts at which the lateral-wall surfaces of the projection part 710 and the lateral-wall surfaces of the ribs 720 cross each other (see FIG. 8).

When the accumulation of the foreign matter C as described above is advanced, the foreign matter C is caught in a sliding part between the seal ring 700 and a surface of the shaft hole of the housing, which causes a degradation in sealing performance. Further, the advancement of the accumulation of the foreign matter C also causes the acceleration of sliding abrasion. Particularly, in recent years, a soft material such as aluminum has been often used as a material of a housing to achieve light weight, and there have been concerns about sliding abrasion.

CITATION LIST

Patent Literature

[PTL 1] Japanese Patent No. 6191689

SUMMARY

Technical Problem

An object of the present disclosure is to provide a seal ring capable of preventing foreign matter from being caught in a sliding part.

Solution to Problem

The present disclosure employs the following means for solving the above object.

That is, the present disclosure provides a seal ring configured to be attached to an annular groove provided on an outer periphery of a shaft and seal an annular gap between the shaft and a housing rotating relative to each other to maintain fluid pressure in a sealed region in which the fluid pressure is configured to change, the seal ring is configured to be in close contact with a lateral-wall surface on a lower pressure side of the annular groove and slide against an inner peripheral surface of a shaft hole in the housing in which the shaft is to be inserted, wherein the seal ring has, on an outer peripheral surface side thereof, a pair of recessed parts extending in a circumferential direction on both sides in a width direction thereof to form a projection part between the pair of recessed parts, and has a plurality of ribs connected to the projection part and extending to lateral surfaces of the seal ring at intervals in the circumferential direction inside the pair of recessed parts, and a plurality of ribs arranged on a sealed region side among the plurality of ribs have lateral-wall surfaces on an upstream side in a relative rotation direction of the housing with respect to the shaft, each of the lateral-wall surfaces having inclined surfaces inclined from the upstream side to a downstream side in the relative rotation direction of the housing from the projection part toward the lateral surfaces of the seal ring.

According to the present disclosure, the seal ring has, on the outer peripheral surface side thereof, the pair of recessed parts extending in the circumferential direction on both sides in the width direction thereof. Thus, fluid pressure from the inner peripheral surface side and fluid pressure from the outer peripheral surface side can be cancelled each other at the recessed parts. This reduces sliding resistance. Further, the seal ring has the plurality of ribs connected to the projection part and extending to the lateral surfaces of the seal ring at intervals in the circumferential direction inside the pair of recessed parts. Thus, the posture of the seal ring inside the annular groove can be stabilized. Further, the plurality of ribs which are arranged on the sealed region side have the lateral-wall surfaces on the upstream side in the relative rotation direction of the housing with respect to the shaft, each of the lateral-wall surfaces having the inclined surfaces inclined from the upstream side to the downstream side in the relative rotation direction of the housing from the projection part to the lateral surfaces of the seal ring. When foreign matter contained in a fluid to be sealed enters the recessed parts, the foreign matter is discharged to the outside of the recessed parts by the inclined surfaces. Thus, the accumulation of foreign matter in the recessed parts can be reduced.

Each of the plurality of ribs may gradually narrow toward the lateral surfaces of the seal ring from the projection part.

Thus, the above inclined surfaces can exist regardless of the relative rotation directions of the shaft and the housing and regardless of which one of the sides of both lateral surfaces of the seal ring is in the sealed region.

Advantageous Effect of the Disclosure

As described above, the present disclosure can prevent foreign matter from being caught in a sliding part.

DRAWINGS

DETAILED DESCRIPTION

Hereinafter, with reference to the drawings, a mode for carrying out the present disclosure will be illustratively described in detail on the basis of an embodiment. However, dimensions, materials, shapes, their relative arrangements, or the like of constituents described in this embodiment will not intend to limit the scope of the present disclosure unless otherwise specifically described. Note that a seal ring according to this embodiment is suitably used to seal an annular gap between a shaft and a housing rotating relative to each other to maintain hydraulic pressure in a transmission such as an AT or a CVT for an automobile. Further, in the following description, a "higher pressure side" represents a side on which the pressure becomes higher when differential pressure is generated between both sides of the seal ring, whereas a "lower pressure side" indicates a side on which the pressure of the seal ring becomes lower when differential pressure is generated between both sides of the seal ring.

Embodiment

Figure 1:
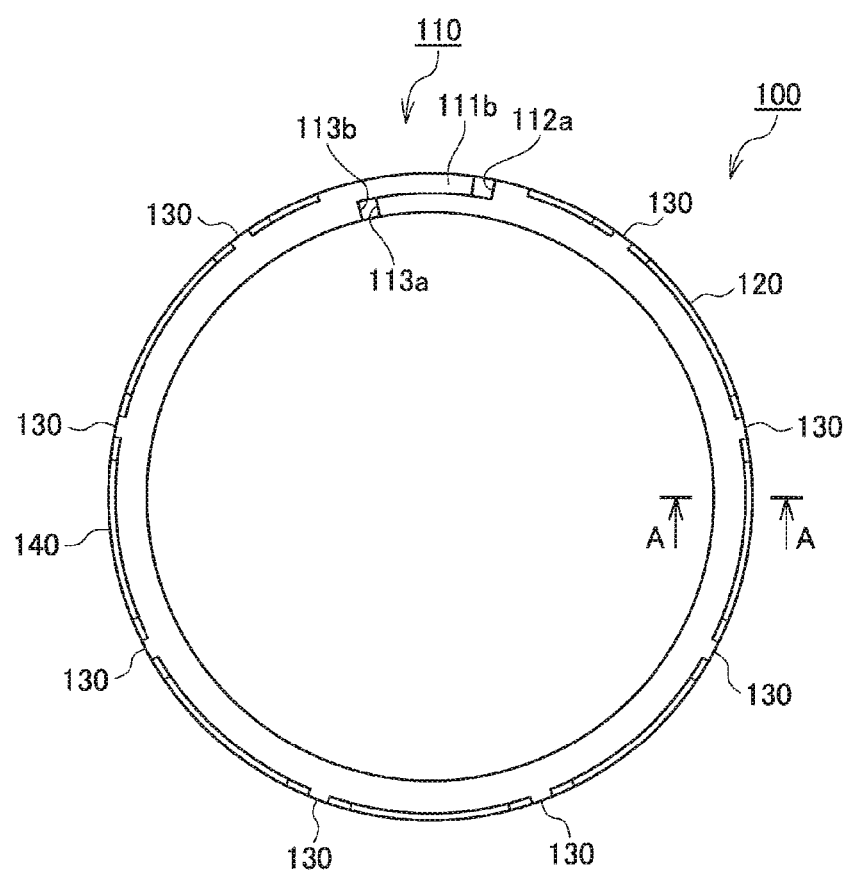
FIG. 1 is a side view of a seal ring according to an embodiment of the present disclosure.
Figure 2:
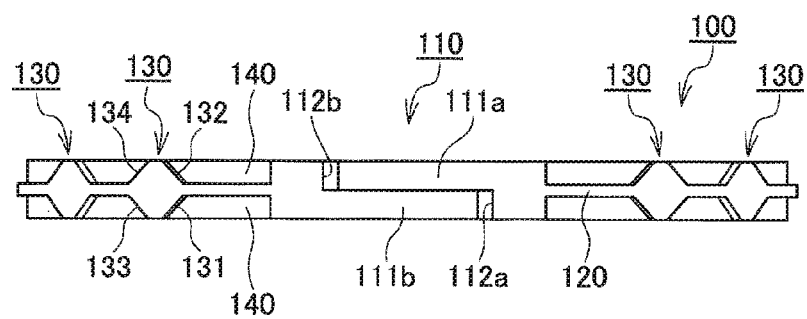
FIG. 2 illustrates the seal ring according to the embodiment of the present disclosure from an outer peripheral surface side view.
Figure 3:
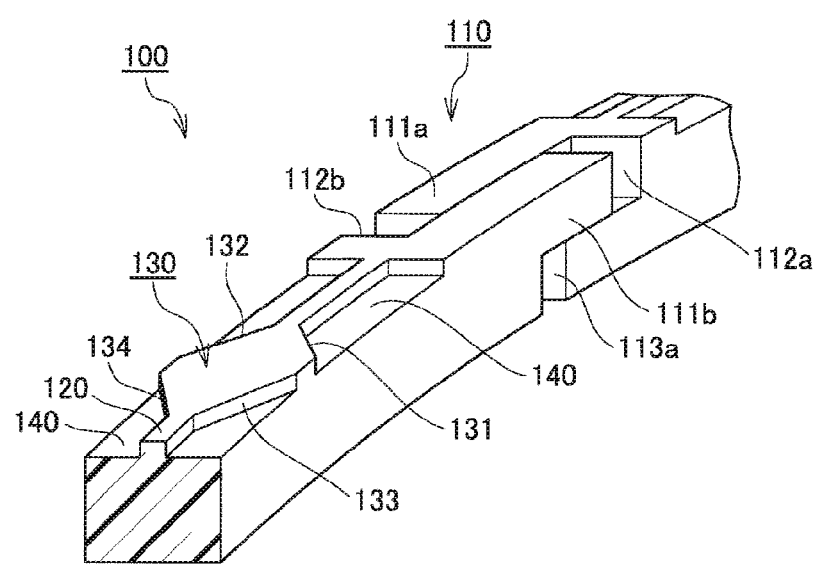
FIG. 3 is a partially-broken perspective view of the seal ring according to the embodiment of the present disclosure.
Figure 4:
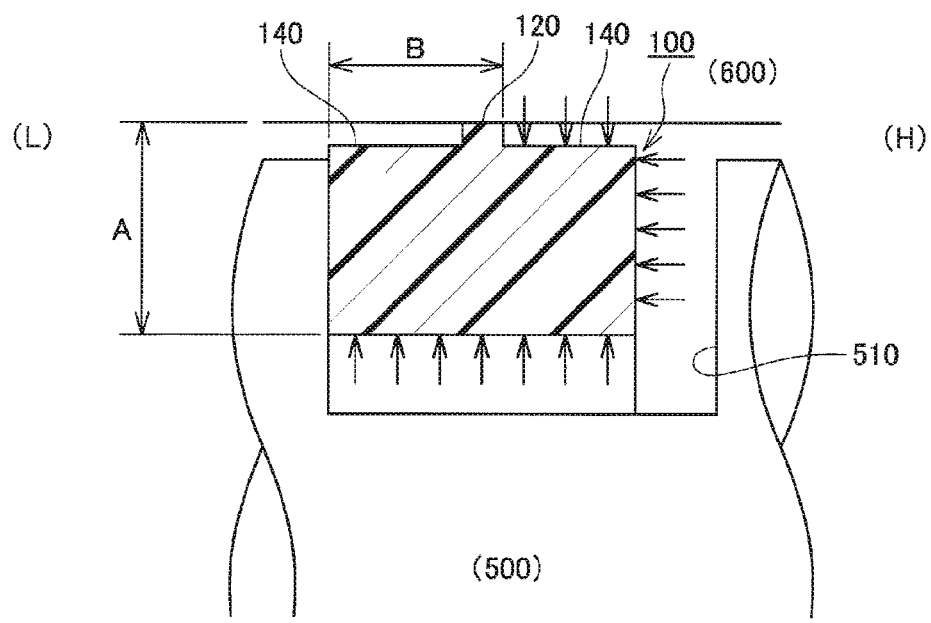
FIG. 4 is a schematic sectional view of a sealing structure using the seal ring according to the embodiment of the present disclosure.
Figure 5:
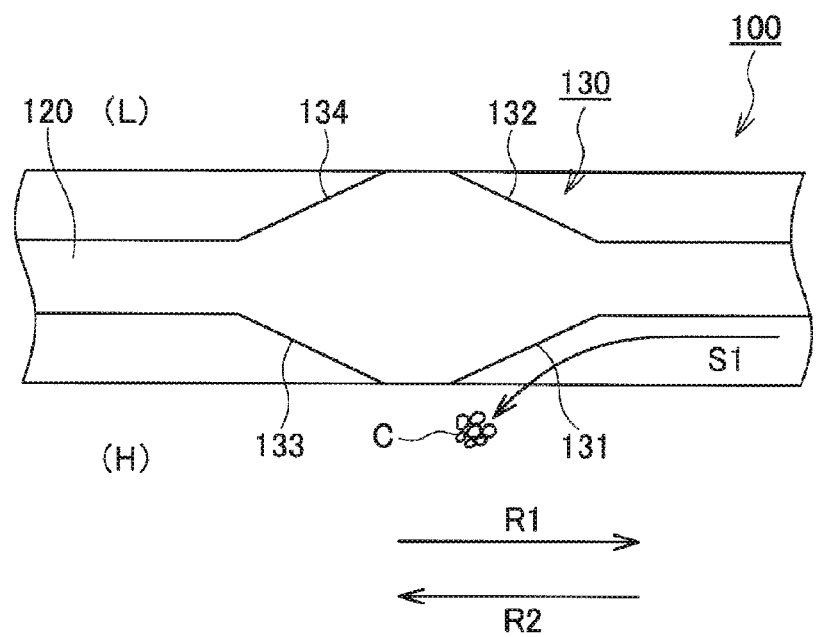
FIG. 5 is an enlarged view of a part of the seal ring according to the embodiment of the present disclosure from the outer peripheral surface side view.

The seal ring according to the embodiment of the present disclosure will be described with reference to FIGS. 1 to 5. FIG. 1 is a side view of the seal ring according to the embodiment of the present disclosure. FIG. 2 illustrates the seal ring according to the embodiment of the present disclosure from an outer peripheral surface side view seen from an upper side in FIG. 1. FIG. 3 is a partially-broken perspective view of the seal ring according to the embodiment of the present disclosure. FIG. 4 is a schematic sectional view of a sealing structure using the seal ring according to the embodiment of the present disclosure. The sectional view of the seal ring in FIG. 4 is a sectional view of the seal ring along the line A-A in FIG. 1. FIG. 5 is an enlarged view of a part of the seal ring according to the embodiment of the present disclosure from the outer peripheral surface side view.

<Configuration of Seal Ring>

A seal ring 100 according to the embodiment is configured to be attached to an annular groove 510 provided on an outer periphery of a shaft 500 and seals the annular gap between the shaft 500 and a housing 600 (an inner peripheral surface of a shaft hole in the housing 600 in which the shaft 500 is inserted) rotating relative to each other. The seal ring 100 is configured to maintain fluid pressure in a sealed region in which the fluid pressure (hydraulic pressure in the embodiment) of a fluid to be sealed is configured to change. The fluid pressure in a region on a right side in FIG. 4 is configured to change, and the seal ring 100 is configured to maintain the fluid pressure in the sealed region on the right side in the figure. In a state in which an engine of an automobile is stopped, the fluid pressure in the sealed region is low and no load is generated, whereas the fluid pressure in the sealed region becomes high when the engine is started.

The seal ring 100 is made of a resin material such as polyether ether ketone (PEEK), polyphenylenesulfide (PPS), and polytetrafluoroethylene (PTFE). Further, an outer peripheral surface of the seal ring 100 is configured to have a circumferential length shorter than a circumferential length of the inner peripheral surface of the shaft hole of the housing 600 and configured not to have an interference.

The seal ring 100 has an abutment joint part 110 at one portion in its circumferential direction. Further, the seal ring 100 has, on the outer peripheral surface side, a pair of recessed parts 140 extending in the circumferential direction on both sides in its width direction. Thus, a projection part 120 sliding against the inner peripheral surface of the shaft hole of the housing 600 is provided between the pair of recessed parts 140. The bottom surfaces of the pair of recessed parts 140 are constituted by surfaces concentric with the inner peripheral surface of the seal ring 100. Further, lateral surfaces of the projection part 120 are configured to be perpendicular to the bottom surfaces of the recessed parts 140.

In the seal ring 100 according to this embodiment, a plurality of ribs 130 connected to the projection part 120 and extending to lateral surfaces of the seal ring are provided at intervals in the circumferential direction inside the pair of recessed parts 140.

The seal ring 100 according to the embodiment is configured by providing the abutment joint part 110, the recessed parts 140, the projection part 120, and the plurality of ribs 130 provided inside the recessed parts 140 to an annular member having a rectangular section. Note that this description is intended to illustrates the shape of the seal ring 100 and is not necessarily meant to that a production of the respective parts is performed by processing an annular member having a rectangular section. The respective parts may be formed by cutting an annular member having a rectangular section which is molded beforehand. For example, the seal ring 100 having the projection part 120 and the plurality of ribs 130 may be manufactured by forming the recessed parts 140 by cutting a member having the abutment joint part 110 which is molded in advance. A method for manufacturing the seal ring 100 is not particularly limited.

The abutment joint part 110 is cut by so-called a special step cut which gives a step-like appearance from an outer peripheral surface side view and both of lateral-wall surface side views. Specifically, on one side of a cut part, a first fitting projection part 111*a* and a first fitting recessed part 112*a* are provided on an outer periphery side, and on the other side of the cut part, a second fitting recessed part 112*b* in which the first fitting projection part 111*a* is fitted and a second fitting projection part 111*b* fitted in the first fitting recessed part 112*a* on the outer periphery side. On both sides of the cut part, planar surfaces 113*a* and 113*b* facing each other are provided on an inner peripheral surface side.

The special step cut is a known art, and thus its detailed description will be omitted. The special step cut enables stable sealing performance of the seal ring 100 to be kept even if the circumferential length of the seal ring 100 changes due to its thermal expansion and contraction. Note that the embodiment describes the abutment joint part 110 having the special step cut as an example. The abutment joint part 110 is not limited to this. The abutment joint part 110 may have a straight cut, a bias cut, a step cut, or the like. The seal ring 100 may be an endless type without the abutment joint part 110 if the material of the seal ring 100 has low elasticity as PTFE.

The pair of recessed parts 140 is provided over the entire circumference except a vicinity of the abutment joint part 110 and the plurality of ribs 130. A portion at which the recessed parts 140 are not provided in the vicinity of the abutment joint part 110, the outer peripheral surface of the projection part 120, and the outer peripheral surfaces of the ribs 130 are flush with each other. Accordingly, an annular continuous seal surface is formed on the outer peripheral surface side of the seal ring 100. That is, in regions other than the vicinity of the abutment joint part 110, the outer peripheral surface of the seal ring 100 slides against the inner peripheral surface of the shaft hole at the outer peripheral surface of the projection part 120 and the outer peripheral surfaces of the ribs 130.

In the seal ring 100 according to the embodiment, a distance (corresponding to a length of a region B in FIG. 4) from the lateral surface on one side of the projection part 120 to the lateral surface on the other side of the seal ring 100 and a distance from the lateral surface on the other side of the projection part 120 to the lateral surface on the one side of the seal ring 100 are set to be shorter than a distance (corresponding to a length of a region A in FIG. 4) from the inner peripheral surface of the seal ring 100 to the outer peripheral surface of the projection part 120. The distance from the lateral surface on the one side of the projection part 120 to the lateral surface on the other side of the seal ring 100 and the distance from the lateral surface on the other side of the projection part 120 to the lateral surface on the one side of the seal ring 100 are set to be equal.

By the setting of the relationship between the region A and the region B as described above, the seal ring 100 is caused to have a narrower effective pressure-receiving area from the inner peripheral surface side contributing to a pressing force against the inner peripheral surface of the shaft hole by fluid pressure than an effective pressure-receiving area from the lateral surface side contributing to a pressing force against the lateral-wall surface on the lower pressure side of the annular groove 510 by the fluid pressure. Thus, when there is differential pressure between both sides of the seal ring 100, an effective pressure-receiving region (a pressure-receiving area) of pressure acting on the seal ring 100 radially outwardly becomes smaller than that of pressure acting in an axial direction. This causes the seal ring 100 not to slide against the annular groove 510, but the outer peripheral surface of the seal ring 100 can be caused to more reliably slide against the inner peripheral surface of the shaft hole.

In the seal ring 100 according to the embodiment, each of the plurality of ribs 130 gradually narrows toward the lateral surfaces of the seal ring from the projection part 120. Thus, both lateral surfaces of the ribs 130 provided on both sides of the projection part 120 are constituted by inclined surfaces, each of which are inclined with respect to the circumferential direction. Hereinafter, both lateral surfaces of the ribs 130 provided on both sides of the projection part 120 will be called a first lateral-wall surface 131, a second lateral-wall surface 132, a third lateral-wall surface 133, and a fourth lateral-wall surface 134 for the sake of explanation (see FIGS. 2, 3, and 5).

<Mechanism of Seal Ring During Use>

The mechanism of the seal ring 100 according to the embodiment in use will be described with reference in particular to FIG. 4. The sealing structure according to the embodiment is constituted by the shaft 500, the housing 600, and the seal ring 100 configured to seal the annular gap between the shaft 500 and the housing 600. FIG. 4 illustrates a state in which an engine is started and differential pressure is generated across the seal ring 100 (a state in which pressure on the right side becomes higher than pressure on the left side in the figure).

In a state in which no load is generated, no differential pressure is generated between the right and left regions, and no fluid pressure acts from the inner peripheral surface side. Thus, the seal ring 100 can separate from the lateral-wall surface on the left side of the annular groove 510 in FIG. 4 and the inner peripheral surface of the shaft hole. In a state in which the engine is started and differential pressure is generated, the seal ring 100 is in close contact with the lateral-wall surface on the lower pressure side (L) of the annular groove 510 and slides against the inner peripheral surface of the shaft hole (see FIG. 4).

<Advantages of Seal Ring According to the Embodiment>

In the seal ring 100 according to the embodiment, a fluid to be sealed is introduced into the recessed parts 140 on the higher pressure side (H) among the pair of recessed parts 140 when differential pressure is generated across both sides of the seal ring 100. Thus, even if fluid pressure increases, the fluid pressure acts toward the inner peripheral surface side in regions in which the recessed parts 140 are provided.

Here, in the embodiment, the bottom surfaces of the recessed parts 140 are constituted by the surfaces concentric with the inner peripheral surface of the seal ring 100. Thus, in the regions on the higher pressure side (H) in which the recessed parts 140 are provided, a direction in which the fluid pressure acts from the inner peripheral surface side and a direction in which the fluid pressure acts from the outer peripheral surface side are oppositely oriented. Arrows in FIG. 4 illustrate the fluid pressure acting on the seal ring 100. Thus, the seal ring 100 according to the embodiment can reduce an increase in pressure on the outer peripheral surface side due to an increase in fluid pressure and can keep sliding torque low.

In the embodiment, the plurality of ribs 130 connected to the projection part 120 are provided inside the pair of recessed parts 140. This stabilize the posture of the seal ring 100 in the annular groove 510. Thus, inclination of the seal ring 100 in the annular groove 510 can be reduced. Further, the plurality of ribs 130 increases the rigidity of the seal ring 100, particularly the strength in the twisting direction. Accordingly, even under an environment in which differential pressure becomes large, deformation of the seal ring 100 can be reduced and stable sealing performance can be achieved.

In the seal ring 100 according to the embodiment, a plurality of ribs 130 arranged on the sealed region side among the plurality of ribs 130 have the lateral-wall surfaces on an upstream side in the relative rotation direction of the housing 600 with respect to the shaft 500, which will be called "specific lateral-wall surfaces" hereinafter for the sake of explanation, configured as follows. That is, each of the specific lateral-wall surfaces are constituted by inclined surfaces inclined from the upstream side to the downstream side in the relative rotation direction of the housing 600 from the projection part 120 to the lateral surfaces of the seal ring. This point will be described in detail with reference to FIG. 5.

The lower side of the seal ring 100 in FIG. 5 is the higher pressure side (H), that is, the sealed region side, whereas the upper side of the seal ring 100 in FIG. 5 is the lower pressure side (L). An arrow R1 in FIG. 5 indicates the rotation direction of the shaft 500 and the seal ring 100 with respect to the housing 600 when the shaft 500 and the housing 600 rotate relative to each other. An arrow R2 indicates the rotation direction of the housing 600 with respect to the shaft 500 and the seal ring 100. In this case, a fluid to be sealed flows in the direction indicated by the arrow S1 in FIG. 5. In the case of an example shown in FIG. 5, the first lateral-wall surface 131 serves as the specific lateral-wall surface described above.

Note that when the higher pressure side (H) and the lower pressure side (L) are exchanged with each other, that is, when the upper side of the seal ring 100 in FIG. 5 is the higher pressure side whereas the lower side of the seal ring 100 in FIG. 5 is the lower pressure side in FIG. 5, the second lateral-wall surface 132 serves as the specific lateral-wall surface described above. Further, when the relative rotation directions of the shaft 500 and the housing 600 are exchanged with each other and the relationship between the higher pressure side (H) and the lower pressure side (L) is as in a state shown in FIG. 5, the third lateral-wall surface 133 serves as the specific lateral-wall surface. In addition, when the higher pressure side (H) and the lower pressure side (L) are exchanged with each other and the relative rotation directions of the shaft 500 and the housing 600 are exchanged with each other, the fourth lateral-wall surface 134 serves as the specific lateral-wall surface.

The plurality of ribs 130 in the seal ring 100 according to the embodiment have the specific lateral-wall surfaces as described above. Thus, even if foreign matter C contained in the fluid to be sealed enters the recessed parts 140, the foreign matter C is discharged to the outside of the recessed parts 140 by the specific lateral-wall surfaces (inclined surfaces) as illustrated by the arrow S1 in FIG. 5. Thus, accumulation of foreign matter in the recessed parts 140 can be reduced.

Further, each of the plurality of ribs 130 according to the embodiment gradually narrows toward the lateral surfaces of the seal ring from the projection part 120. Thus, the specific lateral-wall surfaces (inclined surfaces) can exist regardless of the relative rotation directions of the shaft 500 and the housing 600 and regardless of which one of the both of the lateral surface sides of the seal ring 100 is a sealed region. This enables any of the first lateral-wall surfaces 131, the second lateral-wall surfaces 132, the third lateral-wall surfaces 133, and the fourth lateral-wall surfaces 134 to serve as the specific lateral-wall surfaces.

Figure 6:
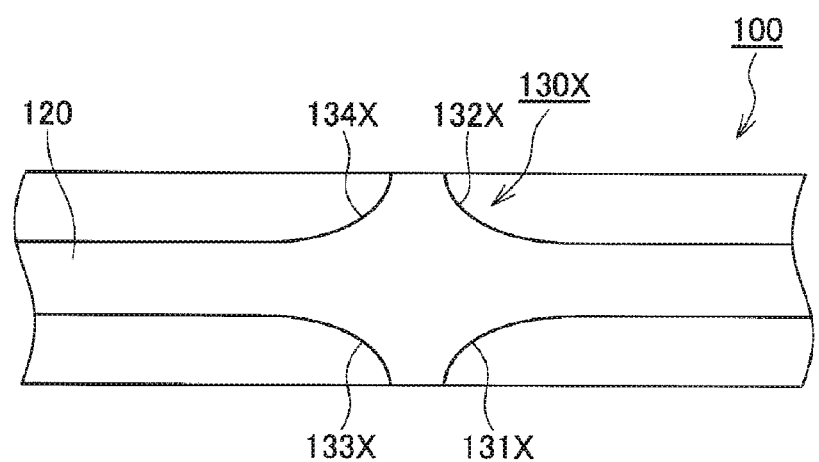
FIG. 6 illustrates a modified example of a rib according to the embodiment of the present disclosure.
Figure 7:
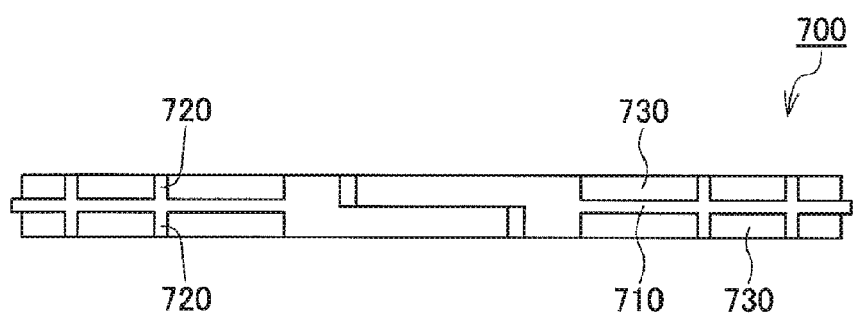
FIG. 7 illustrates a seal ring according to a conventional example from an outer peripheral surface side view.
Figure 8:
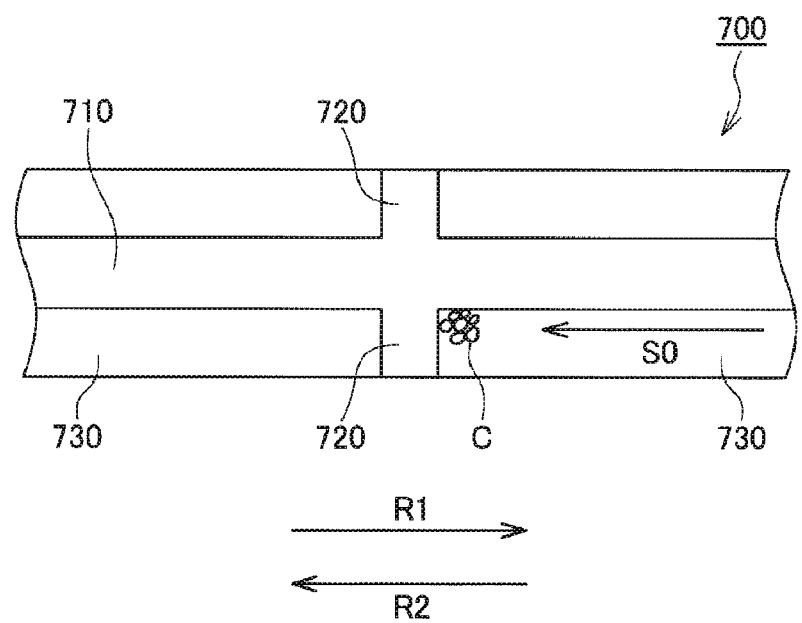
FIG. 8 is an enlarged view of a part of the seal ring according to the conventional example from the outer peripheral surface side view.

The seal ring 100 according to the embodiment can prevent foreign matter C from being caught in the sliding part between the seal ring 100 and the surface of the shaft hole of the housing 600. This reduces a degradation in sealing performance and sliding abrasion. Further, this removes a difficulty in using a soft material such as aluminum as the material of the housing 600 to achieve light weight. Note that the above embodiment shows a case in which the lateral-wall surfaces (the first lateral-wall surfaces 131, the second lateral-wall surfaces 132, the third lateral-wall surfaces 133, and the fourth lateral-wall surfaces 134) of the ribs 130 are constituted by planes. However, the lateral-wall surfaces of the ribs in the present disclosure are not limited to planes. For example, like a rib 130X according to a modified example illustrated in FIG. 6, lateral-wall surfaces (a first lateral-wall surface 131X, a second lateral-wall surface 132X, a third lateral-wall surface 133X, and a fourth lateral-wall surface 134X) can be constituted by curved surfaces. In this configuration, the respective lateral-wall surfaces of the rib 130X and the lateral-wall surfaces of the projection part 120 can be smoothly connected to each other. This configuration also achieves similar functions and effects as described above.

REFERENCE SIGNS LIST

100 Seal ring
110 Abutment joint part
111a First fitting projection part
111b Second fitting projection part
112a First fitting recessed part
112b Second fitting recessed part
113a, 113b Planar surface
120 Projection part
130 Rib
131 First lateral-wall surface
132 Second lateral-wall surface
133 Third lateral-wall surface
134 Fourth lateral-wall surface
140 Recessed part
500 Shaft
510 Annular groove
600 Housing
C Foreign matter

The invention claimed is:

1. A seal configured to be attached to an annular groove provided on an outer periphery of a shaft and seal an annular gap between the shaft and a housing rotating relative to each other to maintain fluid pressure in a sealed region in which the fluid pressure is configured to change, the seal comprising:
- a seal ring configured to be in close contact with a lateral-wall surface on a lower pressure side of the annular groove and slide against an inner peripheral surface of a shaft hole in the housing into which the shaft is to be inserted, wherein
- the seal ring has an outer peripheral surface, that includes a pair of recessed parts each extending from opposite side surfaces of the seal ring in a width direction and extending in a circumferential direction thereof to form an annular projection part between the pair of recessed parts, and has a plurality of ribs connected to the projection part and extending to the side surfaces of the seal ring at intervals in the circumferential direction inside the pair of recessed parts, and
- a plurality of ribs arranged on a sealed region side among the plurality of ribs have lateral-wall surfaces on an upstream side in a relative rotation direction of the housing with respect to the shaft, each of the lateral-wall surfaces having linear inclined surfaces inclined symmetrically relative to one another on opposite sides of the projection part from the upstream side to a downstream side in the relative rotation direction of the housing from the projection part toward the side surfaces of the seal ring.

2. The seal ring according to claim 1, wherein each of the plurality of ribs gradually narrows toward the lateral surfaces of the seal ring from the projection part.

3. The seal ring according to claim 1, wherein both sides of each of the plurality of ribs include linear inclined wall surfaces, the linear inclined wall surfaces on opposite sides of the plurality of ribs being symmetric.

4. A seal configured to be attached to an annular groove provided on an outer periphery of a shaft and seal an annular gap between the shaft and a housing rotating relative to each other to maintain fluid pressure in a sealed region in which the fluid pressure is configured to change, the seal comprising: a seal ring configured to be in close contact with a lateral-wall surface on a lower pressure side of the annular groove and slide against an inner peripheral surface of a shaft hole in the housing into which the shaft is to be inserted, wherein the seal ring has an outer peripheral surface, that includes a pair of recessed parts each extending from opposite side surfaces of the seal ring in a width direction and extending in a circumferential direction thereof to form an annular projection part between the pair of recessed parts, and has a plurality of ribs connected to the projection part and extending to the side surfaces of the seal ring at intervals in the circumferential direction inside the pair of recessed parts, and a plurality of ribs arranged on a sealed region side among the plurality of ribs have lateral-wall surfaces on an upstream side in a relative rotation direction of the housing with respect to the shaft, each of the lateral-wall surfaces having linear inclined surfaces inclined symmetrically relative to one another on opposite sides of the projection part from the upstream side to a downstream side in the relative rotation direction of the housing from the projection part toward the side surfaces of the seal ring, wherein both sides of each of the plurality of ribs include linear inclined wall surfaces, the linear inclined wall surfaces on opposite sides of the plurality of ribs being symmetric.

* * * * *